US012656515B2

(12) United States Patent
Singh et al.

(10) Patent No.: US 12,656,515 B2
(45) Date of Patent: Jun. 16, 2026

(54) NOISE REDUCTION FOR MICRO-SEISMIC MONITORING USING DEEP LEARNING

(71) Applicant: ExxonMobil Technology and Engineering Company, Spring, TX (US)

(72) Inventors: Sudeep Singh, Calgary (CA); Xinlong Liu, Nepean (CA); Simona O. Costin, Calgary (CA); Christopher T. Reaume, Calgary (CA); Taylor K. Fink, Calgary (CA)

(73) Assignee: ExxonMobil Technology and Engineering Company, Spring, TX (US)

( * ) Notice: Subject to any disclaimer, the term of this patent is extended or adjusted under 35 U.S.C. 154(b) by 675 days.

(21) Appl. No.: 18/060,084

(22) Filed: Nov. 30, 2022

(65) Prior Publication Data

US 2023/0194741 A1 Jun. 22, 2023

Related U.S. Application Data

(60) Provisional application No. 63/265,061, filed on Dec. 7, 2021.

(51) Int. Cl.
| | |
|---|---|
| *G01V 1/32* | (2006.01) |
| *G01V 1/28* | (2006.01) |
| *G06N 5/022* | (2023.01) |

(52) U.S. Cl.
CPC .............. *G01V 1/325* (2013.01); *G01V 1/288* (2013.01); *G06N 5/022* (2013.01)

(58) Field of Classification Search
CPC ......... G01V 1/325; G01V 1/288; G06N 5/022
See application file for complete search history.

(56) References Cited

U.S. PATENT DOCUMENTS

| | | | |
|---|---|---|---|
| 6,049,508 | A | 4/2000 | Deflandre |
| 6,920,083 | B2 | 7/2005 | Therond et al. |
| 8,041,510 | B2 | 10/2011 | Dasgupta |
| 8,942,063 | B2 | 1/2015 | Vu et al. |
| 9,271,188 | B2 | 2/2016 | Hu et al. |
| 9,416,641 | B2 | 8/2016 | Airey |
| 9,523,784 | B2 | 12/2016 | Orban |

(Continued)

FOREIGN PATENT DOCUMENTS

| | | | | |
|---|---|---|---|---|
| FR | 3057980 A1 | * | 4/2018 | .......... G06F 18/2411 |

OTHER PUBLICATIONS

Wu et al., "Unsupervised machine learning for waveform extraction in microseismic denoising", 2020, JOAP, pp. 1-9 (Year: 2020).*

(Continued)

*Primary Examiner* — Elias Desta
(74) *Attorney, Agent, or Firm* — Vorys, Sater, Seymour and Pease LLP

(57) ABSTRACT

A method for classifying a microseismic event, including: analyzing microseismic event files through a combination of two fault tolerant machine learning pipelines, an acoustic machine learning pipeline and a visual machine learning pipeline; and generating a classification prediction for the microseismic event files by combining predictions from the acoustic machine learning pipeline and the visual machine learning pipeline.

10 Claims, 6 Drawing Sheets

(56) References Cited

U.S. PATENT DOCUMENTS

| | | | |
|---|---|---|---|
| 10,317,549 | B2 | 6/2019 | Rawles et al. |
| 10,921,471 | B2 * | 2/2021 | Lolla .................... E21B 49/00 |
| 11,341,410 | B1 * | 5/2022 | Johnson ................ G06N 5/01 |

OTHER PUBLICATIONS

Yang et al., "Microseismic event detection and classification based on convolutional neural network", 2021, JOAP, pp. 1-10 (Year: 2021).*

Deng et al., "The analysis of rock damage process based on the microseismic monitoring and numerical simulations", 2017, p. 1-17 (Year: 2017).*

Aminzadeh, F et al. (2011) "Artificial Neural Network Based Autopicker for Micro-Earthquake Data," Seg Technical Program Expanded Abstracts, pp. 1623-1625.

Bailey, J. R. et al. (2008) "Passive Seismic Data Management and Processing to Monitor Heavy Oil Steaming Operations," Soc. of Petro. Eng., SPE/PS/CHOA 117484, PS2008-379, Calgary, AB, CA, Oct. 20-23, 2008, 10 pages.

Bohnhoff, Marco et al. (2017) "M4ShaleGas—Measuring, Monitoring, Mitigating and Managing the Environmental Impact of Shale Gas Seismic Sensors and Data Evaluation for Leakage Detection Authors and Affiliation," M4ShaleGas, (XP055586632), pp. 1-31.

Boone, T. J. et al. (1999) "Microseismic Monitoring for Fracturing in the Colorado Shales above a Thermal Oil Recovery Operation," (ARMA-99-1069) Rock Mechanics for Industry, ISBN9058090523, pp. 1069-1076.

Duncan, P. M. et al. (2010) "Reservoir Characterization using Surface Microseismic Monitoring," Geophysics, v.75, No. 5, pp. 75A139-75A146.

Fei, T. et al. (1995) "Finite-Difference Solutions of the 3-D Eikonal Equation," SEG, SMigl. 1, pp. 1129-1132.

Lin, B. et al. (2018) "Automatic Classification of Multi-Channel Microseismic Waveform Based on DCNN-SPP," v. 159, pp. 446-452.

Maity, D. et al. (2013) "Fracture Characterization in Unconventional Reservoirs Using Active and Passive Seismic Data With Uncertainty Analysis Through Geostatistical Simulation," pp. 1-16.

Qin, F. et al. (1990) "Solution of the Eikonal Equation of a Finite-Difference Method," SEG Expanded Abstracts, SD1.6, pp. 1004-1007.

Talebi, S. et al. (2007) "Microseismic Detection of Casing Failures at a Heavy Oil Operation," U.S. Rock Mechanics Symposium, American Rock Mechanics Association (ARMA-07-208), 7 pages.

Tan, Jeff et al. (2007) "Analysis and Classification of Microseismic Events," University of Clagary Crewes, pp. 1-3, 7-8, 10-12.

Urbancic, Ted et al. (2015) "Microseismic Monitoring Applications in Heavy Oil Reservoirs Microseismic Monitoring: How It Works," pp. 38, 40.

Warpinski, N. R. et al. (2010) "Source-Mechanism Studies on Microseismicity Induced by Hydraulic Fracturing," Soc. of Petro. Eng., SPE 135254, Florence, Italy, Sep. 19-22, 2010, 18 pages.

Withers, Robert J. et al., (1996) "Fracture Development During Cuttings Injection Determined by Passive Seismic Monitoring", SEG Expanded Abstracts, pp. 106-109, 4 pages.

Withers, Robert J. et al., (1998) "Seismic Imaging of Cotton Valley Hydraulic Fractures" SEG Expanded Abstracts, pp. 1-4, 4 pages.

Zinno, Richard et al, (1998) "Overview: Cotton Valley Hydraulic Fracture Imaging Project" SEG Expanded Abstracts, pp. 1-4, 4 pages.

\* cited by examiner

NOISE REDUCTION FOR MICRO-SEISMIC MONITORING USING DEEP LEARNING

CROSS REFERENCE TO RELATED APPLICATIONS

This application claims the priority benefit of U.S. Provisional Patent Application No. 63/265,061, filed Dec. 7, 2021, entitled NOISE REDUCTION FOR MICRO-SEISMIC MONITORING USING DEEP LEARNING, the entirety of which is incorporated by reference herein.

TECHNOLOGICAL FIELD

The exemplary embodiments described herein generally relate to processes and methods to monitor the integrity of subsurface operations related to the recovery of hydrocarbons from, and the injection of fluids and waste material into, the subsurface. More specifically, the disclosure relates to using microseismic data to monitor well integrity, geomechanics, and other parameters during oil and gas production operations.

BACKGROUND

This section is intended to introduce various aspects of the art that may be associated with the present disclosure. The discussion is meant to provide a framework to facilitate a better understanding of particular aspects of the present disclosure. Accordingly, it should be understood that this section should be read in this light, and not necessarily as an admission of prior art.

In oil and gas production operations, particularly those involving Enhanced Oil Recovery (EOR) techniques and other types of fluid injection, human activity may impact stress distribution in the subsurface. For example, in thermal injection processes such as Cyclic Steam Stimulation (CSS), Steam-Assisted Gravity Drainage (SAGD), and variations of these processes, the high-pressure, high-temperature steam injected into a reservoir may generate thermal stresses around the well and areas adjacent to the injection site. The overburden may also experience shear stresses due to reservoir dilation resulting from the injection of steam. Formation dilation and geomechanical stresses may also arise from the injection of water, gas, and other fluids, such as carbon dioxide from carbon capture and storage (CCS) or slurrified waste injection operations. These stresses may cause casing or liner failures, casing or liner slips, cement fractures, fluid incursions to overburden, and other well-integrity problems that may affect reservoir performance. These events may generate acoustic signals (also known as microseismic signals), which can be detected by seismic sensors (represented by triaxial geophones). In the absence of appropriate risk mitigation measures, these stresses may cause casing or liner failures, casing or liner slips, cement micro-fractures or de-bonding, fluid incursions, breaching to surface, and other operation integrity problems. The microseismic waves generated from such events can be recorded and analyzed to evaluate operation integrity. As such, these types of events are hereafter referred to as "microseismic" events.

Microseismic events are low-scale seismic disturbances often caused by human activity (to be distinguished from large-scale seismic events generated by earthquakes and other natural causes). Microseismic events are typically $10^4$ to $10^6$ times lower in magnitude than the natural earthquakes that can be felt at the Earth's surface. Because of the link between operation integrity issues and microseismic events, passive microseismic monitoring has become an important tool to monitor subsurface conditions. Passive microseismic monitoring relies on sensitive devices (sensors) that are able to detect relatively low-intensity seismic waves in the ground. While seismic activity in the subsurface near the wellbores may result from multiple factors involving not only human activity but also natural causes, microseismic monitoring technology has evolved to provide sufficiently accurate data for trained operators to distinguish and identify potential casing failures, subsurface fractures, and other events threatening the integrity of production operations.

Microseismic monitoring is the passive observation of microseismic events. The industry has progressed microseismic monitoring technology since the early 1990's. R. J. Withers and R. Dart describe a program to evaluate a hydraulic fracture treatment in *Seismic Imaging of Cotton Valley Hydraulic Fractures* (SEG 1998-0968). This field experiment was also presented in *Overview: Cotton Valley Hydraulic Fracture Imaging Project* by R. Zinno, J. Gibson, R. N. Walker, and R. J. Withers (SEG 1998-0926). R. J. Withers and S. Rieven describe a permanent monitoring system to evaluate fracture growth of a waste injection operation in *Fracture Development During Cuttings Injection Determined by Passive Seismic Monitoring* (SEG 1996-0106). The relationship of the recorded event data to the source mechanism has been investigated, for example, in *Source-Mechanism Studies on Microseismicity Induced by Hydraulic Fractures* (SPE-135254, 2010). Previous publications related to the present subject matter include: S. Talebi, M Cote, and R. J. Smith, *Microseismic Detection of Casing Failures at a Heavy Oil Operation*, U.S. Rock Mechanics Symposium, American Rock Mechanics Association (ARMA-07-208) 2007; T. J. Boone, S. Nechtschein, R. J. Smith, D. Youck, and S. Talebi, *Microseismic Monitoring for Fracturing in the Colorado Shales above a Thermal Oil Recovery Operation* (ARMA-99-1069); and J. R. Bailey, R. J. Smith, C. M. Keith, K. H. Searles, and L. Wang, *Passive Seismic Data Management and Processing to Monitor Heavy Oil Steaming Operations* (SPE-117484, 2008), the contents of all of which are incorporated in their entirety by reference herein.

Conventional enhanced surveillance of subsurface operation integrity using microseismic events is described in U.S. patent application Ser. Nos. 16/271,203 and 16/447,560, the entirety of each of which is hereby incorporated by reference herein.

Throughout these and other applications, a common theme has been the challenge created by the vast quantity of recorded data generated by several dozen sensors recording acoustic data (microseismic data) continuously at 2,000 samples per second, or more. Current microseismic monitoring systems generate enormous amounts of data that require multiple hours of manual review by trained operators each day. Consequently, a need exists for systems and methods to more efficiently analyze and classify microseismic data gathered during oil and gas production and other injection operations to quickly identify and isolate significant incidents that may affect operations and require corrective action.

SUMMARY

A method for classifying a microseismic event, comprising: analyzing microseismic event files through a combination of two fault tolerant machine learning pipelines, an acoustic machine learning pipeline and a visual machine learning pipeline; and generating a classification prediction for the microseismic event files by combining predictions from the acoustic machine learning pipeline and the visual machine learning pipeline.

In the method, wherein the acoustic machine learning process comprises: dividing the microseismic event files into a plurality of component audio files; converting the component audio files into power spectrum files; and generating a plurality of predictions for the power spectrum files by applying an acoustic machine learning model corresponding to each component used to divide the microseismic event file into the component files.

In the method, wherein the visual machine learning process comprises: converting the microseismic event files into plurality of spectrograms; and generating a prediction for the fused Spectrogram representation by applying a visual machine learning model.

In the method, wherein the dividing includes dividing the microseismic event file into three Cartesian coordinate components that are used to record three directional components of a microseismic event.

In the method, wherein the converting includes fusing together multiple power spectrum files for each of the Cartesian coordinate components, and the acoustic machine learning model is applied to the fused spectrum files.

In the method, wherein the converting includes fusing the spectrograms into a fixed length fused spectrograms.

In the method, wherein the fixed length is based on a number of geophones used in a monitoring well that generated the microseismic event files.

In the method, wherein the audio files are generated by sampling the microseismic event files.

In the method, further comprising converting the spectrograms into RGB images, and then generating a prediction for the spectrogram by applying a visual machine learning model to the RGB images.

In the method, wherein a weighting is assigned to different microseismic prediction event categories, and then combining to generate final prediction is based on the weighting function applied to plurality of predictions.

In the method, further comprising classifying noise with criteria developed for different classes based on predetermined parameters.

The foregoing has broadly outlined the features of the present disclosure so that the detailed description that follows may be better understood. Additional features will also be described herein.

Figure 1A:
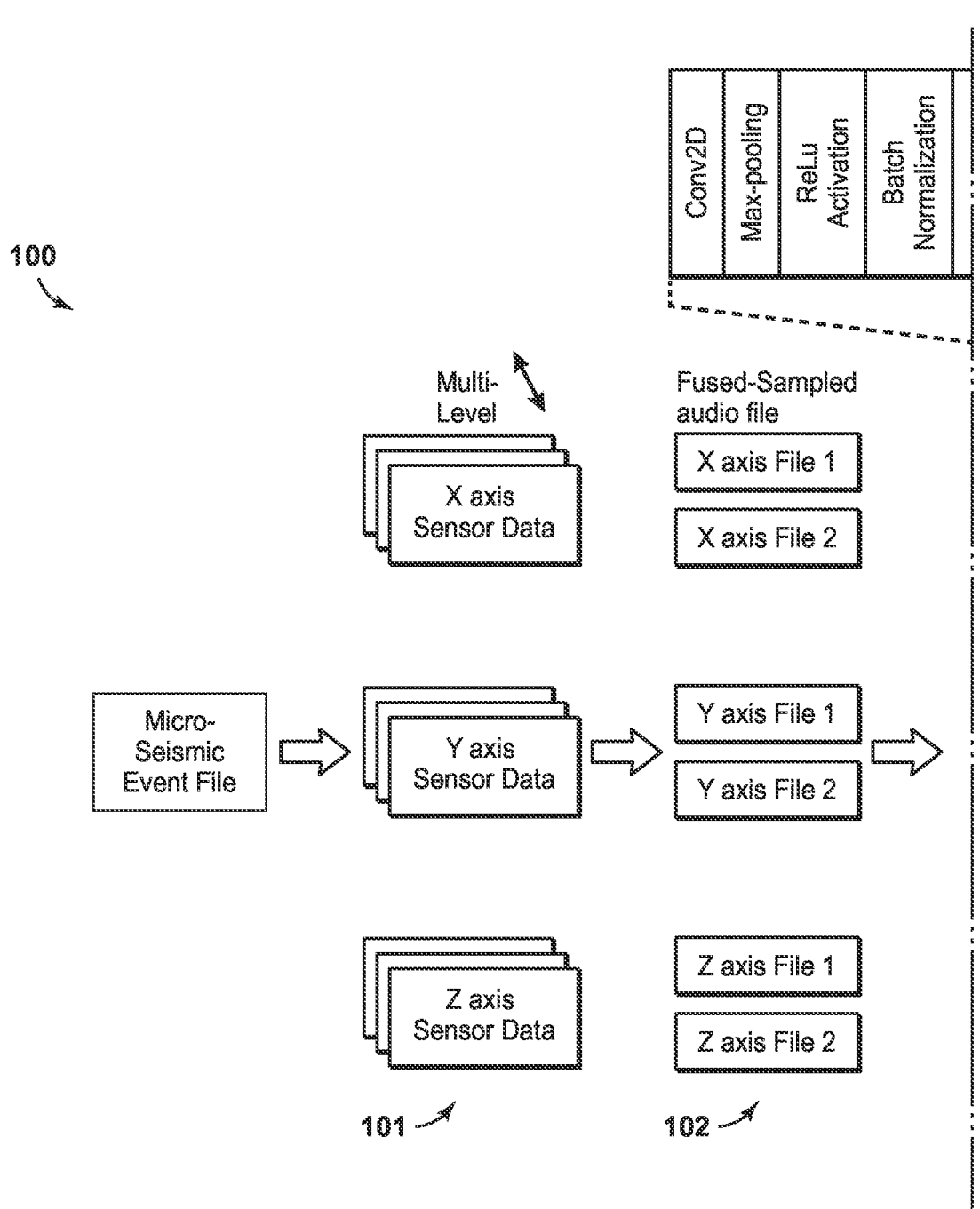
FIGS. 1A, 1B, and 1C illustrate an exemplary method embodying the present technological advancement, with a focus on the acoustic portion of the method.

It should be noted that the figures are merely examples and no limitations on the scope of the present disclosure are intended thereby. Further, the figures are generally not drawn to scale, but are drafted for purposes of convenience and clarity in illustrating various aspects of the disclosure. Certain features and components herein may be shown exaggerated in scale or in schematic form and some details of conventional elements may not be shown in the interest of clarity and conciseness. In addition, for the sake of clarity, some features not relevant to the present disclosure may not be shown in the drawings.

DETAILED DESCRIPTION

To promote an understanding of the principles of the disclosure, reference will now be made to the features illustrated in the drawings. No limitation of the scope of the disclosure is hereby intended by use of specific language. Any alterations and further modifications, and any further applications of the principles of the disclosure as described herein are contemplated as would normally occur to one skilled in the art to which the disclosure relates. When referring to the figures described herein, the same reference numerals may be referenced in multiple figures for the sake of simplicity.

Definitions

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The terms "including" and "comprising" are used in an open-ended fashion, and thus, should be interpreted to mean "including, but not limited to."

The term "monitoring well" refers to a wellbore in the ground made by drilling or inserting a conduit into the subsurface to introduce one or more seismic sensors, sensor receivers, and/or sensor arrays to monitor seismic activity in the vicinity of a region of interest, such as a plurality of producing wells or injection sites. A monitoring well may be a dedicated well for the sole purpose of monitoring, or it may have been converted temporarily or permanently from a production or injection well.

The term "microseismic event" refers to any source of seismic activity or disturbances detectable by a passive monitoring system. Examples include, but are not limited to, well integrity events such as casing breaks or failures, slips between multiple casings (e.g., surface casing and production casing), cement de-bonding events (also known as cement cracks), or small harmonic tremors termed continuous microseismic radiation (CMR), as well as other events surrounding a wellbore or injection site, such as sheardominated events and other surface events. The terms "seismic event" and "acoustic event" may be used interchangeably with the term "microseismic event."

The articles "the," "a" and "an" are not necessarily limited to mean only one, but rather are inclusive and open ended so as to include, optionally, multiple such elements.

The terms "approximately," "about," "substantially," and similar terms are intended to have a broad meaning in harmony with the common and accepted usage by those of ordinary skill in the art to which the subject matter of this disclosure pertains. These terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

The phrases "for example," "as an example," and/or simply the terms "example" or "exemplary," when used with reference to one or more components, features, details, structures, methods and/or figures according to the present disclosure, are intended to convey that the described component, feature, detail, structure, method and/or figure is an illustrative, non-exclusive example of components, features, details, structures, methods and/or figures contemplated in the present disclosure. Thus, the described component, feature, detail, structure, method and/or figure is not intended to be limiting, required, or exclusive/exhaustive; and other components, features, details, structures, methods and/or figures, including structurally and/or functionally similar and/or equivalent components, features, details, structures, methods and/or figures, are also within the scope of the present disclosure. Any embodiment or aspect described herein as "exemplary" is not to be construed as preferred or advantageous over other embodiments.

Overview

A non-limiting exemplary embodiment of the present technological advancement is a Python language-based tool that can employ unsupervised and supervised deep learning algorithms, to accurately and reliably classify microseismic data without manual review. The algorithms may be retrained as more data is collected by the geophones, enabling the algorithms to become more accurate. Microseismic monitoring helps with early detection of loss production fluids to the overburden, due to operations incidents, such as production casing breaks or out-of-reservoir fluid excursions. By improving the accuracy of the microseismic classifications, the response time to right mitigative actions to reduce fluid incursion consequences is reduced significantly, which will further protect the subsurface and surface environment.

The present technological advancement can be used to operate a microseismic network with a producing oilfield by managing the large data flow (e.g., 1.5 TB of data collected every day) and analyzing the data in almost real-time 24 hours, seven days a week, and 52 weeks a year. Large quantities of noise events are generated, with the seismic events of interest being buried within the data. Data reduction can be achieved by filtering noise events with alike characteristics of events of interest, which trigger to record a file when certain trigger criteria are met.

The present technological advancement can be hosted on any computing environment be it on-prem or cloud. By hosting the tool within cloud environment, the flexibility to scale up or down the computing resources on demand is achieved and at the same time it eases infrastructure management.

The present technological advancement is the first time that non-interesting (i.e., noise) microseismic events from thermal recovery projects that have elevated pressure and temperatures in the reservoir, are described and classified into a variety of different categories. The present technological advancement can handle the different number of levels (depths) across the passive seismic event data. The monitoring systems conventionally have 5, 8, 10, or 12 levels, with each level recording 3 directional components (north (X), east (Y), and depth (Z)). While such Cartesian coordinates are used here, other coordinate systems could be used. The present technological advancement uses data processing techniques to enable programmatic classification of a microseismic event file. The pre-processing is done differently into two parallel processes; a visual process and an acoustic process. Having two pipelines adds fault tolerance to the system. Fault tolerance generically means systems ability to continue operating despite malfunctions; in relation to our machine learning pipelines this means in case one of our pipeline gives incorrect predictionor is not functioning properly we still can depend on the second pipeline to meet our business objective. Also when both the pipelines are running together the quality of final prediction is better as opposed to using only one pipeline.

Figure 1B:
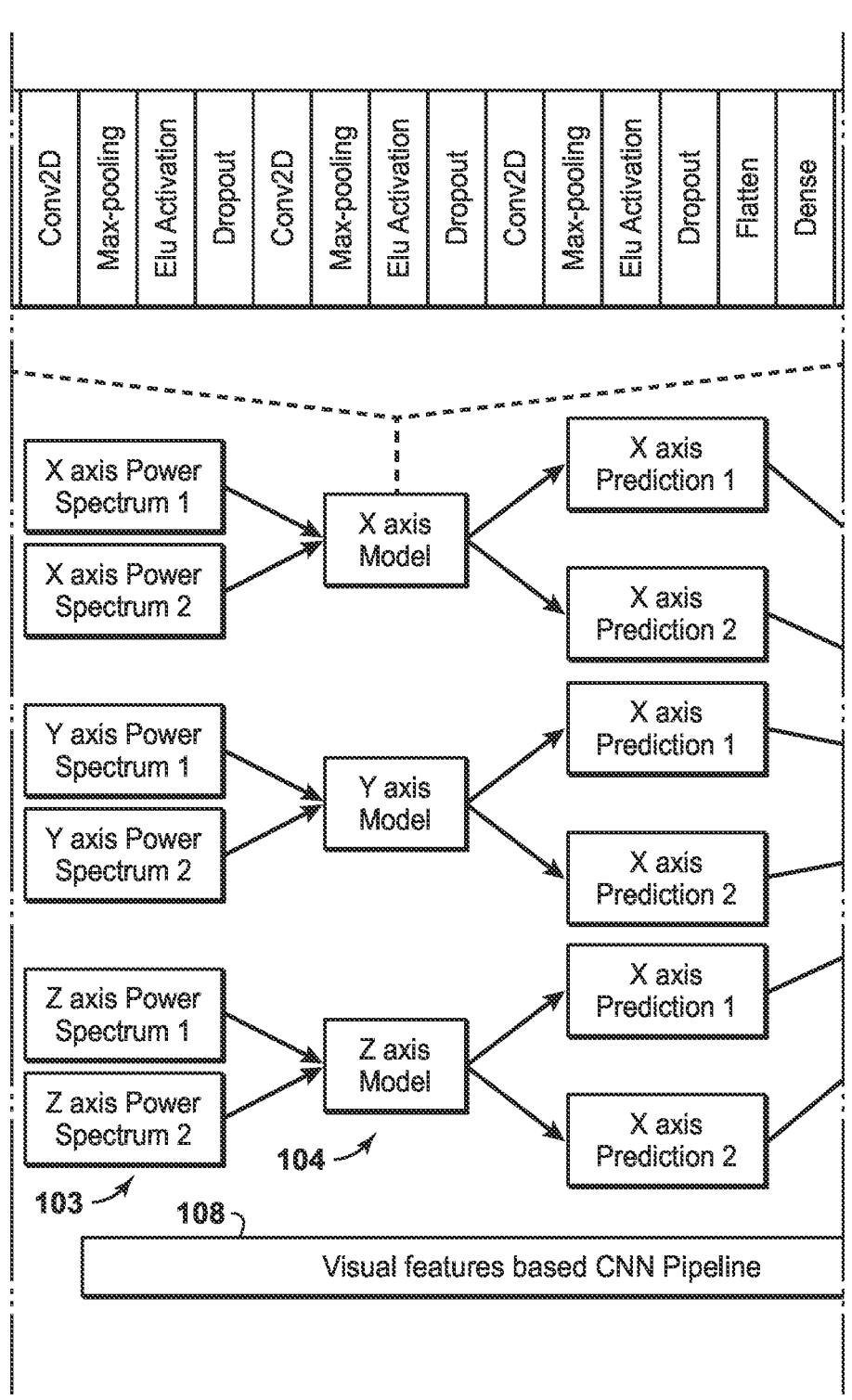
Figure 1C:
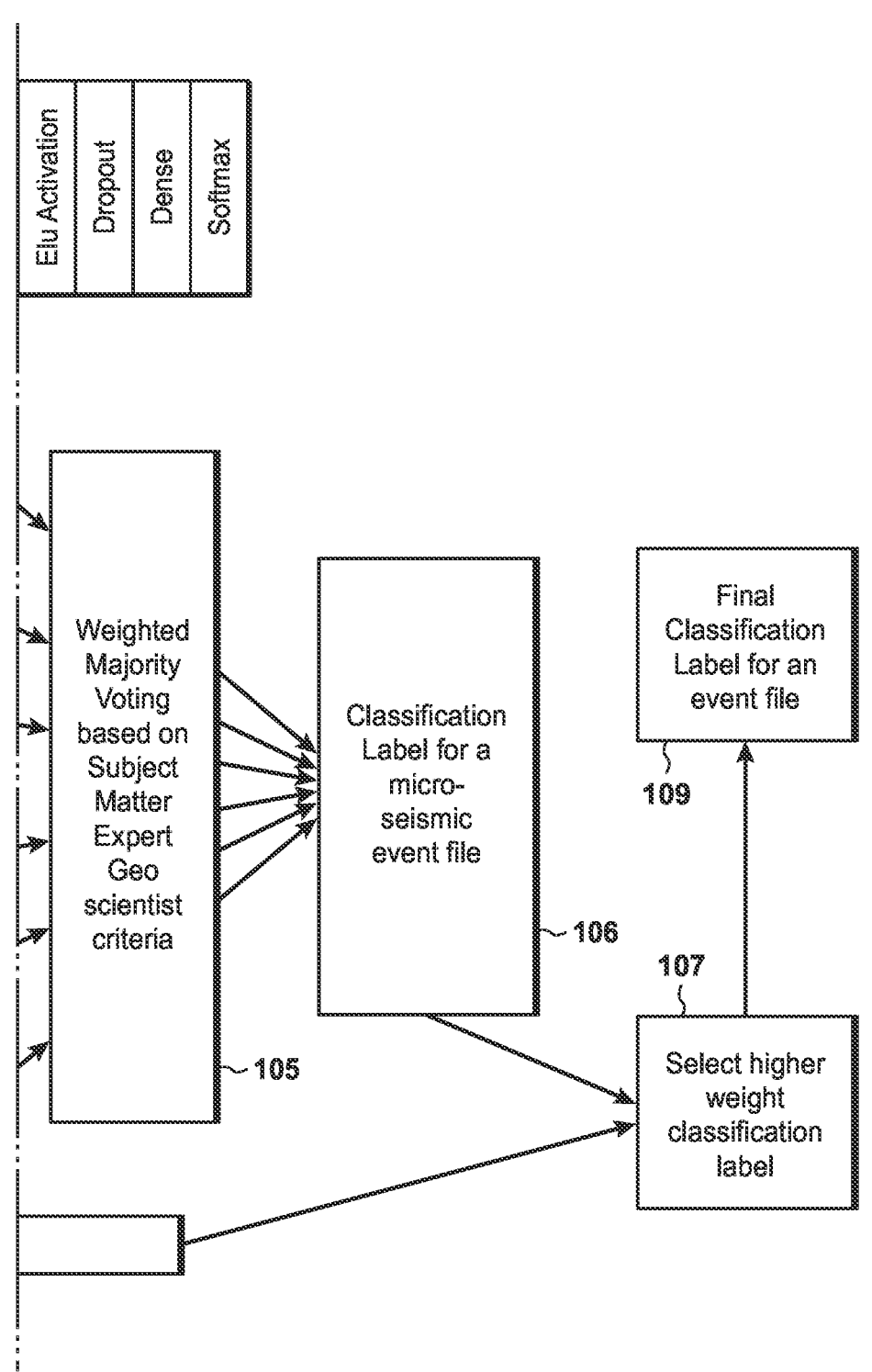

For the acoustic process, a microseismic file (multilevel file corresponding to geophones located at multiple levels) can be decomposed into the X-axis, Y-axis, and Z-axis sensor data. Next, the result data can be sampled and stitched together across multiple levels to form, for example, two or a plurality of audio files, as a representation of a microseismic event, for each Cartesian component. As shown in FIGS. 1A, 1B, and 1C, this can result in a total of 6 files per event file.

Each audio file is converted to a power spectrum, which is then classified by trained convolutional neural network (CNN) acoustic models to generate predictions. The power spectrum data can be input to three 22-layer CNN based sequential neural networks (X-axis acoustic feature model, Y-axis acoustic feature model, and Z-axis acoustic feature model). These models are used to generate 6 predictions, which are in turn used to give one final classification label. This deep learning acoustic process can assign a class to the microseismic event file with high accuracy, by using features extracted from the power spectrum. ResNet and DenseNet are known methods that can be used for initializing weights for a visual pipeline. A goal in using ResNet and DenseNet is to transfer learning fast and avoid computational cost in long duration training. A model in the acoustic pipeline can be trained from scratch, i.e., weights are not initialized.

Each audio file can be transformed into its power spectrum using a short-time Fourier transform (STFT). The window length can range from 32 ms to 200 ms. The overlap length of two consecutive Fourier transform windows can range from 28 ms to 180 ms. The resultant predictions (3 for 5 level, or 6 for 8, 10, 12 level) are then subjected to a weighted majority voting criteria to generate one final preduction from the acoustic process.

For the visual process, the microseismic event file can be converted to a multilevel spectrogram, and then this spectrogram is converted to a fixed length fused spectrogram. For each event file, the raw signal is decoded and decomposed in X-axis, Y-axis, and Z-axis by level. Then, the signal from each axis can be converted to a spectrogram using STFT. The window length of the Fourier transform may range from 32 ms to 100 ms. The overlap length of two consecutive Fourier transform windows can range from 28 ms to 90 ms. Ultimately, all the spectrograms are stacked along the frequency axis to form an overall spectrogram for each event file. The fixed length fused spectrogram can be converted to an RGB image, and this can be classified by CNN models to generate a prediction from the visual process.

Transfer learning can be leveraged to construct the CNN visual model. A pre-trained deep CNN model (e.g., ResNet, DenseNet) is first used as the base model. Then, convolutional layers, fully-connected layers, and a classification layer are stacked on top of the base model, resulting in the final CNN visual model. The number of convolutional layers and fully-connected layers may be selected from 1 to 3.

If the acoustic and visual processes generate two different event categories as their classification result, the final result will be the event category with the higher weight. A weighted majority voting can be applied to these 7 predictions, 6 from acoustic feature CNN process and 1 from visual feature CNN process, to get the final classification for the event file. The weight of the event category is a different weighting value that is assigned to the different event categories. The weight of an event is defined by a user of the system embodying the present technological advancement.

Other ways of weighting can be used. A key idea behind the weighting is that an ensemble of machine learning models have a better chance of getting a correct prediction as compared to a single model, due to the stochastic nature underlying CNN based machine learning algorithms. An embodiment of the present technological advancement can combine predictions from different models to generate a single label as a prediction. An easiest example would be to apply majority voting on all 7 predictions to get one final answer. Weighted majority voting applied here is a bit more advanced where more weight is awarded to predictions of certain models. For example, in an acoustic pipeline x axis models prediction has a higher weight than y axis and z axis models; in other words, 2 x axis analysis predictions will trigger an analysis classification, whereas for y and z axes, this does not apply The following are a non-exclusive list of advantages achieved with the present technological advancement: (1) reduce the cost of operation related to microseismic monitoring by providing a system and methods to programmatically analyze and classify microseismic data gathered during recovery operations to quickly identify significant incidents that may cause fluid incursion to overburden, affect production, and require corrective action; (2) efficiently filter out the noise events, to identify the seismic events of interest within the record, without manual review and analysis of events; (3) improve the integrity of microseismic monitoring operations by providing accurate classification and hence removal of false positives that can occur in conventional monitoring operations; and (4) provide flexibility for a scalable cloud hosted solution that can analyze the microseismic events continuously and in near real-time.

Microseismic Data Acquisition

Microseismic data can be acquired through conventional techniques. U.S. patent application Ser. No. 16/447,560, which is hereby incorporated by reference in its entirety, describes an example of microseismic data acquisition.

8

Exemplary Microseismic Event Classes

"Analysis" contains all sub-categories of already defined events that require future analysis, either manual or automated. Such categories of events for analysis include: casing failure, casing slip, cement crack, heel event, shear dominated (heave) event, and slimhole/liner response. These categories utilize meta-data, and they are not in scope for the present technological advancement.

The following are exemplary "noise categories". "Equipment" includes the following sub-categories: (1) bad cable (electrical intermittent transients on one cable that affect half or all of the channels; (2) bad channels (unresponsive channels with only periodic signals); (3) electrical noise (electrical intermittent transients on random channels); and (4) lightning/power surge (similar to electrical noise, response to static electrical excitation at the surface, appears as delta function spikes on all channels simultaneously). "H2O" is an event recorded at a monitoring well which is filled with water, and includes the following subcategories: (1) tube waves generated in the fluid present in the monitoring well; and (2) high frequency noise in monitoring well filled with water, due to imperfect clamping of sensor to the casing. "Nothing/background" is white noise or simply background noise (i.e., nothing stands out, usually encountered on files that have been forced to trigger, to increase frequency of review during higher risk stages of oil recovery, e.g., reservoir under elevated pressure and temperature). "Operation" includes the following sub-categories: (1) pump noise due to pump rod movement along the production casing; (2) steaming noise due to steam bull-heading through the production casing; and (3) well work noise due to various well work interventions. "Reflected" is reflected, straight line waveform, seismic shot of a seismic survey, and V-shaped events (caused by unknown source and reflected on a high impedance reflective surface, e.g., Earth's surface, unconformities between geological layers, rugose surface in lithological stratigraphic column). "Ripple" is a partial waveform, from an unknown, most likely distant source, and appears as low frequency signals, organized energy, and mono-phased. "Surface" is surface noise due to human/industrial equipment activity at the surface or in the uppermost portion of the production well (<10 m).

The following Table 1 summarizes seismic attributes that can be used to classify analysis and noise event files (which can be extracted from data files).

TABLE 1

| Class | Amplitude (background as reference) | Frequency (background as reference) | Wave-form Energy | Wave-form Move-out consistent with theoretical model of sound through formation | Wave-form Coda | Phase # | Source Polarity (First motions) | Source Loc. | Voltage Range [mV] (shown as power of 10) |
|---|---|---|---|---|---|---|---|---|---|
| Analysis | Moderate to high | High | Organized | Yes | Yes/No | 2 | 1, 2, 3 | 2 | 1 to 3 |
| Noise | | | | | | | | | |
| Operat. | Moderate | Moderate to High | Not organized | No | Yes | 1 | 1, 2, 3 | 2 | 1 |
| Equip. | High | High | Not organized | No | N/A | N/A | N/A | N/A | 1 to 3 |
| Reflected | Moderate to High | High | Organized | No | Yes | 2 | 1, 2 | 1, 2 | 1 |
| Ripple | Low | Low | Organized | No | No | 1 | N/A | N/A | 1 |
| Surface | Moderate | Moderate to High | Organized | Yes | Yes/No | 2 | 1, 2 | 1 | 1 |
| H2O | Moderate | Moderate | Organized | No | Yes | 1 | 1, 2, 3 | 1 | 1 to 2 |

TABLE 1-continued

| Class | Amplitude (background as reference) | Frequency (background as reference) | Wave-form Energy | Wave-form Move-out consistent with theoretical model of sound through formation | Wave-form Coda | Phase # | Source Polarity (First motions) | Source Loc. | Voltage Range [mV] (shown as power of 10) |
|---|---|---|---|---|---|---|---|---|---|
| Nothing/ Background | to High Low | to High Low | Not Organized | No | No | N/A | N/A | N/A | 0 to 1 |

Classification of noise and analysis events can use criteria developed for different classes based on predetermined parameters shown in Table 1. The parameters are determined from a unique historical data set, where the events are curated and labelled by expert analysis.

For Amplitude and Frequency Qualifiers, the plots illustrating these values of 'Analysis' and 'Noise—Equipment' categories are shown as examples.

For "phase #" 1 means mono-phase and 2 means dual phase, in that one or both acoustic waves phases (parallel or perpendicular to the direction of energy propagation, the P and S waves respectively), are recorded at the monitoring station.

The nature of first motions refers to the focal mechanism of seismic energy generated at the source. The first motion can be either compressional or implosive (i.e., the material is initially displaced towards the source), or dilational or explosive (i.e., the material is initially displaced away from the source). In many cases, the source mechanisms involve some combinations of the two, generating mixed, or double-couple first motions. For "Source Polarity", 1 means explosive, 2 means implosive, and 3 means double-couple (or mixed)

For "Source Location", 1 means surface and 2 means subsurface.

The waveform coda refers in passive-source seismic to the presence of coda waves, or a 'train' of waves following the primary wave, which are generated by multiple scattering and reflections of the primary energy in various propagation media (i.e., pipe body, cement annulus, or surrounding geological formation) in a CSS operation. The coda waves travel slower than the primary waves and tend to have smaller amplitude than the primary waves generated by the seismic source. 'Yes' means that coda waves are recorded at the station, 'No' means there are no coda waves recorded.

The waveform moveout of an event recorded at a seismic station depends on the geometry of the sensor array and the material characteristics of the media travelled by the acoustic energy. For the purpose of processing the signal and classifying the potential source of the event, the moveout of an acoustic wave is compared to the theoretical model of a wave travelling through the geological strata. 'Yes' means that the moveout of the waveform as recorded at the station (sensor array) is consistent with the theoretical model of acoustic energy travelling through the subsurface. 'No' means that there is no moveout, or the moveout is not typical for acoustic waves travelling through the subsurface, and may indicate a different medium of propagation (e.g., wellbore fluid).

The waveform energy refers to the visual inspection of a seismic file. When the event file is generated by a specific source, the energy of the event appears to be concentrated, or organized, whereas when there are multiple operational sources or random sources due to human activity or background noise, the acoustic energy in an event file appears random on various sensors, or not organized.

'Voltage Range' represents the range of readings in mV at the system sensors, shown as power of 10 (i.e., 2 to 3 will show a range from 100 to 1000 mV). In the current work, the system sensors are represented by analogue downhole micro-seismic sensors. The sensor output on any given channel is a measurement of sensed acoustic velocity along the sensor's axis and the recorded voltage correlates linearly with the acoustic velocity at frequencies within a specified bandwidth, according to a nominally specified sensor element sensitivity and system amplification. The analogue sensors are provided by ESG (Engineering Seismology Group) Solutions and are industry standard micro-seismic geophones with 15 Hz corner frequency. The geophones have a sensitivity of 43.19 V/M/s (1.097 V/in/s) at a damping specific to a system and multiple elements may be used in series to increase sensitivity.

FIGS. 1A, 1B, and 1C (collectively referred to as FIG. 1) illustrate an exemplary embodiment of the present technological. FIG. 1 primarily describes the acoustic process, whereas the parallel visual process is further described in reference to FIG. 3.

Figures 2A, 2B, 2C, 2D:
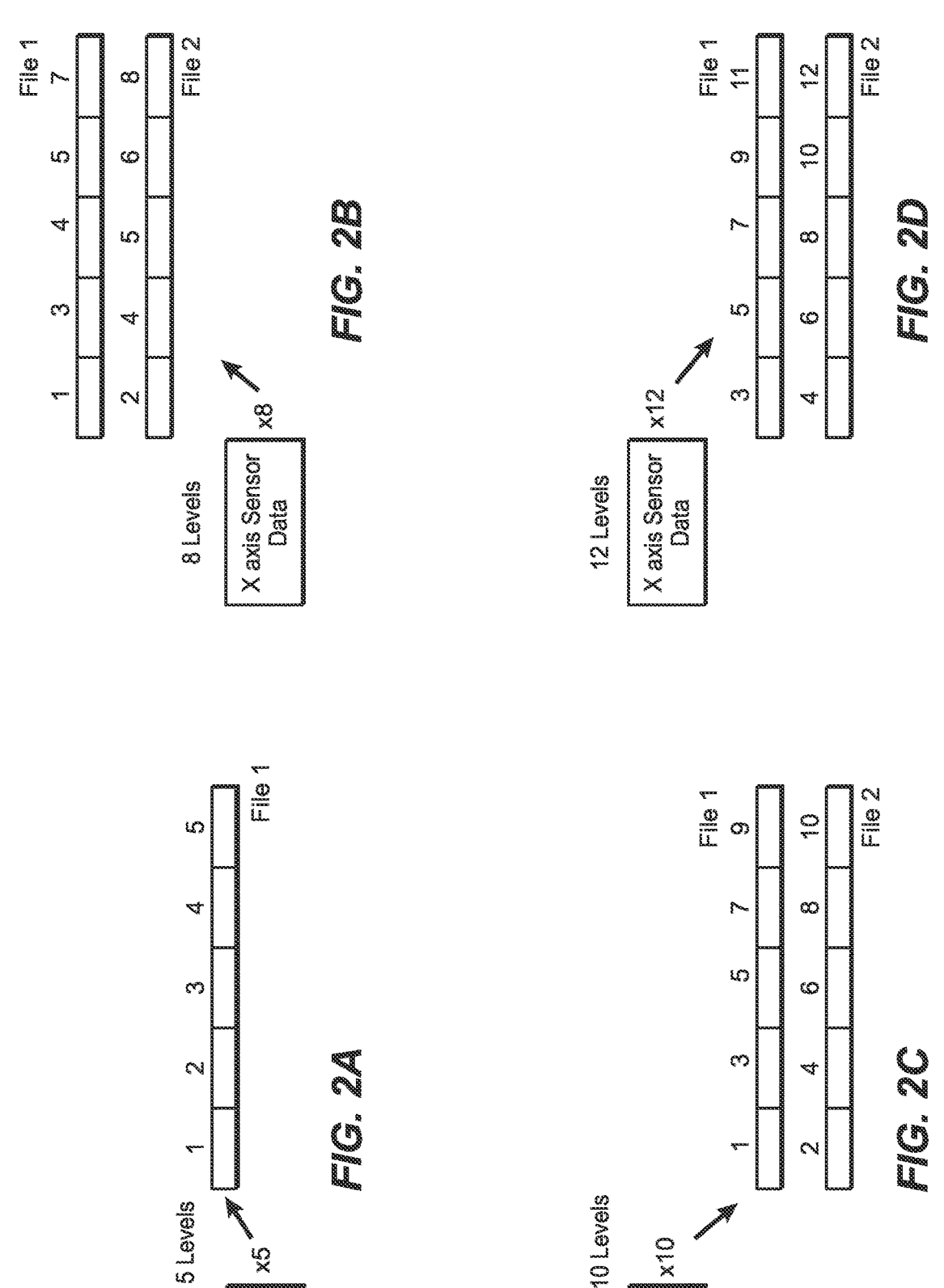
FIGS. 2A, 2B, 2C, and 2D illustrate examples of fused files from multilevel sensor data.

100 represents the acoustic process within FIG. 1. In step 101, a microseismic event file is decomposed into X-axis, Y-axis, and Z-axis sensor data for each level. In step 102, a fused audio file is created from each of the axis sensor data. FIGS. 2A, 2B, 2C, and 2D (collectively referred to as FIG. 2) illustrates different examples of the sampling that may be utilized depending on the number of levels. While the example of FIG. 2 is based on a fusing together 5 different files, this is merely an example. While the examples of FIG. 2 sometime use two files, more files can be created and used. In step 103, the audio files are converted to power spectrum files, which can be accomplished with conventional spectral analysis techniques. In step 104, the power spectrums are fed to a trained CNN (while the details of such CNN is illustrated in FIG. 1 for the X-axis model, that is applicable to each of the Y-axis and Z-axis models) to generate multiple predictions. The CNN was trained with a labeled dataset of historical events based on microseismic monitoring. Dataset preparation is a time consuming fundamental activity required for machine learning solutions. Training of the CNN is a conventional process that those of ordinary skill in the art can accomplish with their own labeled microseismic data, with the present technological advancement providing the preprocessing technique. In step 105, a weighted majority voting process is applied to the various predictions from step 104.

The majority voting process is applied to generate the final classification result for the acoustic process in step 106. There are 8 possible classification results in the acoustic process. If different event categories have the same count for a category (e.g., 3 operation and 3 nothing), then the weighted majority voting will be applied, which is related to the weight of the event categories. A geoscientist will assign different weights to different event categories. The final classification result of the acoustic process will be the event category with the higher weight. (Then, the same weighted majority voting can be applied to the two classification results from the acoustic and visual processes). For example, if both x axis predictions are analysis, then the event is analysis. If majority is split, the assigned weights to each prediction are used to break the split, with the higher level taking precedence (for example, analysis=10, reflected=8, ripple=7, surface=6, operation=5, equipment=4, H2O=2, and nothing=1). This weighting can be changed based on what events of interest need to be filtered out. Other processes could also be used to resolve a split in the predictions. In addition, a weighted health function can be applied to reflect the functionality of a system of sensors containing several nonfunctional channels, to avoid false negatives between "Analysis" and "Noise" categories predictions.

In step 107, another weighted majority voting process is applied against the prediction from step 106 and the result from the visual process 108, in order to generate the final classification label for the event file in step 109.

Figure 3:
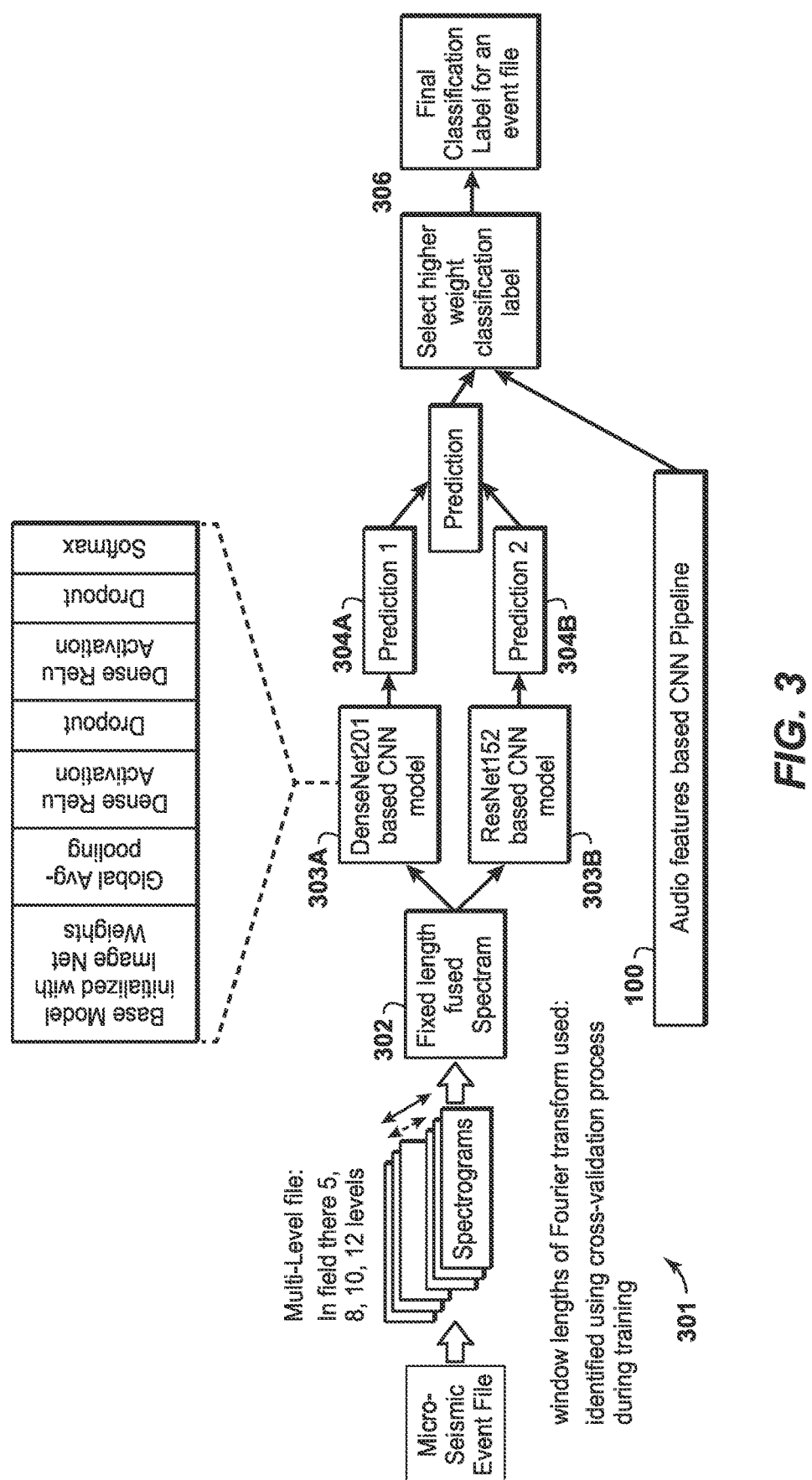
FIG. 3 illustrates an exemplary method embodying the present technological advancement, with a focus on the visual portion of the method.
Figures 4A, 4B, 4C, 4D:
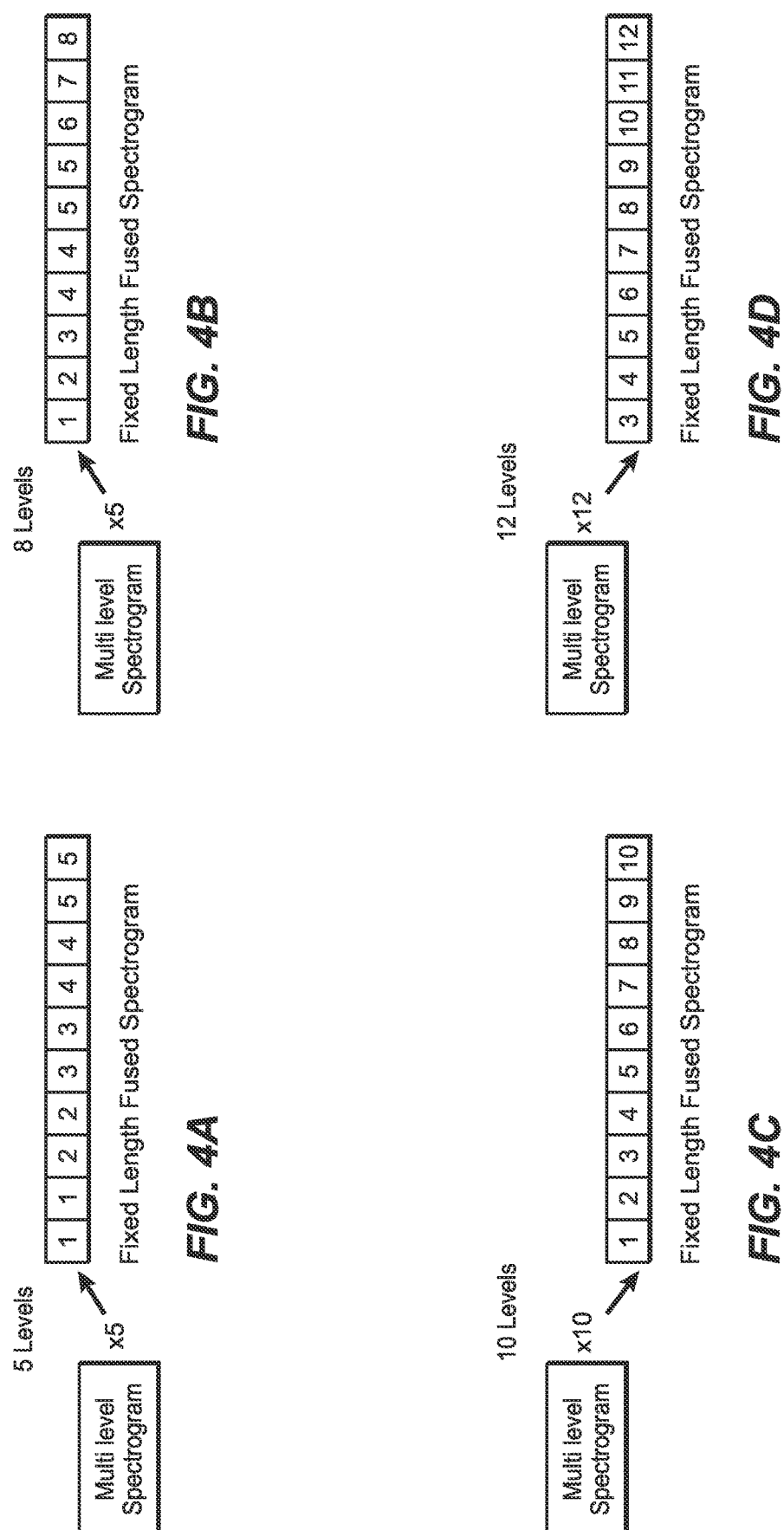
FIGS. 4A, 4B, 4C, and 4D illustrate examples of a multilevel spectrogram to fixed length fused spectrogram.

FIG. 3 provides exemplary details for visual process 108. In step 301, the microseismic file is converted to a spectrogram, which is a visual representation of the spectrum of frequencies of a signal as it varies with time.

In step 301, the microseismic event files are obtained. In Step 302, the microseismic event files are converted to spectrograms by using, for example, Fourier transforms. In step 303, the spectrograms are fused together in fixed lengths. An example of the fusing is shown in FIGS. 4A, 4B, 4C, and 4D for 5, 8, 10, and 12 levels, respectively. In steps 303A and 303B, the fused spectrograms are applied to different machine learning models. The machine learning models yield prediction 1 (step 304A) and prediction 2 (step 304B), which can be combined into a single prediction using any of the weighting techniques described herein or otherwise. The two predictions are combined with the predictions from the acoustic process, the weighted majority voting process is implemented and then step 306 yields a prediction, which are the same steps 107 and 109 as illustrated in FIG. 1.

Experimental examples have shown that the present technological advancement is good at identifying noise. Particularly, such examples have shown an ability to identify 1-2% of 10,000 events that are passed on for further analysis. This is particularly useful as there can be about 10,000 events per day recorded at production pads that need to be analyzed to identify any events that are critical for operations integrity. Manual processing has a 4 to 36 hour turnaround window, and suffers from inconsistencies. The present technological advancement eliminates the need for review of thousands of noise events, improves accuracy of predictions, and reduces the time needed for manual review.

The present technological advancement also improves the functioning of software utilized for microseismic on a computer and hence improves the computer functionality by allowing other processes outside microseismic workflow to be run at the same time, without retaining a large CPU. The present technological advancement is not merely applying a conventional machine learning algorithm to classify a signal as noise or non-noise. Rather, the algorithm allows the computer to operate in a superior manner by the unique combination of an acoustic process and a visual process to improve computer functionality and speed.

The present technological advancement also improves the runtime performance of the microseismic workflow from its unique combination of an acoustic and visual machine learning pipelines to improve inference speed of incoming microseismic data and time to produce an output. Manual processing is time consuming and limited to~tens of files, rather than 10,000. The present technological advancement also addresses false positives in an automated interpretation tool-EMMAA.

Once a microseismic event file is classified as a noise file or analysis file by the present invention, the "analysis" event files are automatically send to a subsequent analysis, which further using specific geophysical processing techniques identifies the potential source of the event file. The geophysical classification of the potential source may drive one or more changes to the production and/or injection operations. For example, one or more of the following actions may be taken: discontinuing fluid injection into or production from the identified wellbore, injecting weighted fluid into the wellbore, injecting nitrogen into the wellbore, temporarily shutting in the wellbore, abandoning the well entirely, reducing steam injection rate or pressure, isolating the casing and continuing production within tubing to reduce pressure in the reservoir and avoid feeding the compromised pipe with reservoir fluids, monitoring the selected wellbore with additional diagnostic tools (e.g., distributed fiber-optic temperature sensors, production logging, injection logging, pressure measurements), performing casing integrity check of the selected wellbore(s), selecting another wellbore to assess for a change in temperature in known water-filled formations, selecting another wellbore to assess a change in light hydrocarbon fractions in known aquifers.

System Implementation

All methods and processes described herein may be implemented by conventional computer systems. For example, such a computer system may include a central processing unit (CPU) coupled to a system bus. The CPU may be any general-purpose CPU, although other types of CPU architectures (or other components) may be used that support the operations described herein. Those of ordinary skill in the art will appreciate that, while only a single CPU may be sufficient, additional CPUs may be present in the computer system. Moreover, the computer system may comprise a networked, multi-processor computer system that may include a hybrid parallel CPU/GPU system. The CPU may execute various logical instructions according to teachings disclosed herein. For example, the CPU may execute machine-level instructions for performing processing according to the methods described above.

Computer systems contemplated herein that may implement the disclosed teachings may include computer components such as non-transitory computer-readable media. Examples of computer-readable media include random access memory (RAM), which may be SRAM, DRAM, SDRAM, or the like. The computer system may also include additional non-transitory, computer-readable media such as read-only memory (ROM), which may be PROM, EPROM, EEPROM, or the like. RAM and ROM may store user and system data and programs, as is known in the art. The computer system may also include one or more input/output (I/O) adapters, communications adapters, graphics processing units, user interface adapters, display drivers, and display adapters.

The I/O adapter may connect additional non-transitory, computer-readable media such as one or more storage devices, including, for example, a hard drive, a compact disc (CD) drive, a floppy disk drive, a tape drive, and the like, to the computer system. Such storage device(s) may be used when RAM is insufficient for the memory requirements associated with storing data for implementations of the present techniques. The data storage of the computer system may be used for storing information and/or other data used or generated as disclosed herein, including microseismic data. In some embodiments, such a network may advantageously utilize remote "cloud" storage systems and other networked systems. Storage device(s) may also be used to store algorithms or software designed to implement the teachings herein. Further, one or more user interface adapters may couple user input devices, such as a keyboard, a pointing device, and/or output devices, to the computer system. A display adapter may be driven by the CPU to control a display driver and a display on a display device, for example, to present microseismic data and information generated through application of the microseismic analyses of the present disclosure.

The architecture of a computer system suitable to implement methods described above may be varied as desired. For example, any suitable processor-based device may be used, including without limitations, personal computers, laptop computers, computer workstations, and multi-processor servers. Moreover, the present technological advancements may be implemented on application specific integrated circuits (ASICs) or very large scale integrated (VLSI) circuits. In fact, persons of ordinary skill in the art may use any number of suitable hardware structures capable of executing logical operations according to the present technological advancement. Input data to the computer system may include various plug-ins and library files. Input data may additionally include configuration information.

The above examples of methods that may be implemented according to the present disclosure to monitor operation integrity during hydrocarbon production or fluid injection operations will be apparent to those skilled in the art. For example, no automated systems exist today that are able to identify and classify events of interest on the basis of their microseismic signature alone, without performing any geophysical processing of the waveform. Whether by manual programming according to examples provided herein, or machine-learning algorithms, the noise-filtered, point-based classification processes disclosed herein provide significant advantages to monitoring operations, including lower costs and increased efficiency of computer-based analysis tools, leading to increased operations integrity, safety, and environmental performance.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method for classifying a microseismic event, comprising:

analyzing, in a real-time manner and via one or more multi-layer neural networks, microseismic event files through a combination of two fault tolerant machine learning pipelines, wherein the two fault tolerant machine learning pipelines include:

at least one of an acoustic machine learning pipeline, the acoustic machine learning pipeline including:
dividing the microseismic event files into a plurality of component audio files;

converting the plurality of component audio files into power spectrum files; and generating a plurality of predictions for the power spectrum files by applying an acoustic machine learning model corresponding to each component used to divide the microseismic event files into the plurality of component audio files; and at least one of a visual machine learning pipeline, the visual machine learning pipeline including:

converting the microseismic event files into plurality of spectrograms;

generating a prediction for a fused spectrogram representation by applying a visual machine learning model; and converting the spectrograms into RGB images, and then generating an additional prediction for the spectrograms by applying the visual machine learning model to the RGB images; and generating a classification prediction for the microseismic event files by combining predictions from the acoustic machine learning pipeline and the visual machine learning pipeline.

2. The method of claim 1, wherein the dividing includes dividing the microseismic event files into three Cartesian coordinate components that are used to record three directional components of the microseismic event.

3. The method of claim 2, wherein the converting includes fusing together multiple power spectrum files for each of the three Cartesian coordinate components, and the acoustic machine learning model is applied to the multiple power spectrum files that are fused together.

4. The method of claim 1, wherein the converting includes fusing the spectrograms into fused spectrograms having a fixed length.

5. The method of claim 4, wherein the fixed length is based on a number of geophones used in a monitoring well that generated the microseismic event files.

6. The method of claim 1, wherein audio files are generated by sampling the microseismic event files.

7. The method of claim 1, wherein different event categories are generated by the acoustic machine learning pipeline and the visual machine learning pipeline, and a weighting is assigned to the different event categories; wherein the combining is then performed to generate a final prediction based on a weighting function applied to the plurality of predictions.

8. The method of claim 1, further comprising classifying noise with criteria developed for different classes based on predetermined parameters.

9. A non-transitory computer readable storage medium, encoded with instructions, which when executed by a processor causes the processor to implement a method for classifying a microseismic event, the method comprising:

analyzing, in a real-time manner and via one or more multi-layer neural networks, microseismic event files through a combination of two fault tolerant machine learning pipelines, wherein the two fault tolerant machine learning pipelines include:

at least one of an acoustic machine learning pipeline, the acoustic machine learning pipeline including:

dividing the microseismic event files into a plurality of component audio files;

converting the plurality of component audio files into power spectrum files; and generating a plurality of predictions for the power spectrum files by applying an acoustic machine learning model corresponding to each component used to divide the microseismic event files into the plurality of component audio files; and at least one of a visual machine learning pipeline, the visual machine learning pipeline including:

converting the microseismic event files into plurality of spectrograms;

generating a prediction for a fused spectrogram representation by applying a visual machine learning model; and converting the spectrograms into RGB images, and then generating an additional prediction for the spectrograms by applying the visual machine learning model to the RGB images; and generating a classification prediction for the microseismic event files by combining predictions from the acoustic machine learning pipeline and the visual machine learning pipeline.

10. The non-transitory computer readable storage medium of claim 9, wherein the dividing includes dividing the microseismic event files into three Cartesian coordinate components that are used to record three directional components of the microseismic event.

\* \* \* \* \*